United States Patent
Soroushian et al.

(10) Patent No.: US 8,233,768 B2
(45) Date of Patent: Jul. 31, 2012

(54) HIERARCHICAL AND REDUCED INDEX STRUCTURES FOR MULTIMEDIA FILES

(75) Inventors: Kourosh Soroushian, San Diego, CA (US); Roland Osborne, San Diego, CA (US); Jason Braness, San Diego, CA (US); Shaiwal Priyadarshi, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 776 days.

(21) Appl. No.: 12/272,631

(22) Filed: Nov. 17, 2008

(65) Prior Publication Data

US 2009/0132599 A1    May 21, 2009

Related U.S. Application Data

(60) Provisional application No. 60/988,513, filed on Nov. 16, 2007.

(51) Int. Cl.
*H04N 9/80* (2006.01)
*G06F 7/00* (2006.01)
*G06F 17/30* (2006.01)
*H04N 5/765* (2006.01)
*H04N 5/76* (2006.01)
*H04N 5/917* (2006.01)
*H04N 5/84* (2006.01)
*H04N 5/89* (2006.01)

(52) U.S. Cl. ........ 386/241; 386/230; 386/232; 386/326; 386/329; 386/332; 386/334; 707/705; 707/711; 707/715; 707/726; 707/741

(58) Field of Classification Search .................. 386/230, 386/232, 241, 326, 329, 332, 334; 707/705, 707/711, 715, 726, 741
See application file for complete search history.

(56) References Cited

U.S. PATENT DOCUMENTS 7,493,018 B2 * 2/2009 Kim .............................. 386/241
2006/0235880 A1 * 10/2006 Qian .......................... 707/104.1

OTHER PUBLICATIONS

International Search Report for International Application No. PCT/US 08/83816, date completed Jan. 10, 2009, date mailed Jan. 22, 2009, 2 pgs.
Written Opinion of the International Searching Authority for International Application No. PCT/US 08/83816, date completed Jan. 10, 2009, date mailed Jan. 22, 2009, 5 pgs.

* cited by examiner

*Primary Examiner* — Daquan Zhao
(74) *Attorney, Agent, or Firm* — Kauth, Pomeroy, Peck & Bailey LLP (57) ABSTRACT

Playback and distribution systems and methods for multimedia files are provided. The multimedia files are encoded with indexes associated with the content data of the multimedia files. Through the use of the indexes, playback of the content is enhanced without significantly increasing the file size of the multimedia file.

6 Claims, 11 Drawing Sheets

HIERARCHICAL AND REDUCED INDEX STRUCTURES FOR MULTIMEDIA FILES

CROSS-REFERENCE TO RELATED APPLICATIONS

This application claims priority to U.S. Provisional Application No. 60/988,513, filed Nov. 16, 2007, the disclosure of which is incorporated herein by reference.

BACKGROUND

The present invention relates generally to multimedia files and more specifically to the indexing of information within a multimedia file.

In recent years, the playback of multimedia files has become an integrated part of the average consumer's daily life. Cellular telephones, DVD players, personal computers, and portable media players are all examples of devices that are capable of playing a variety of multimedia files. While each device may be tailored to a particular multimedia format, the extensive proliferation of these devices encourages a certain level of interoperability amongst the different device classes and categories. Likewise, there are certain features such as fast-forward, reverse, start, stop, play, and pause which are expected to behave similarly across all device categories, despite their performance capabilities and use-case application.

One of the most common features of media playback devices is the support for random access, fast-forward and reverse playback of a multimedia file, which is sometimes referred to as "trick play". Performing trick play functionality generally requires displaying the video presentation at a higher speed in forward and reverse direction, and resuming the overall presentation from a position close to where the viewer terminated the video trick play activity. The audio, subtitle, and other elements of the presentation are typically not used during trick play operations, even though that can be subject to a device's operating preference. In accommodating trick play functionality, multimedia files typically contain an index section used to determine the location of all frames, and specifically the video frames which can be independently decoded and presented to the viewer. When all index information is stored in a single location within a file and linearly references the multimedia information within the file, a player must seek to a specific index entry in order to be able to play a file. For example, a player that is instructed to play a multimedia presentation at the half-way point of the presentation typically processes the first half of the index data before being able to determine the set of data points required to commence playing.

The index section has many other potential applications as well: it may be a necessary element in basic playback of multimedia files that exhibit poor multiplexing characteristics; the index section may also be used to skip over non-essential information in the file; also, an index is often required for the resumption of playback after the termination of trick play functions.

SUMMARY

Embodiments of the invention utilize indexes that can increase the efficiency with which a player can perform a variety of functions including trick play functions. In several embodiments, the index is a hierarchical index. In many embodiments, the index is a reduced index and, in a number of embodiments, the index is expressed using bit field flags and associated data fields.

In one embodiment, a method of playing back content by a playback device stored in a media file is provided. The method comprises providing a media file to a playback device, the media file having content data, cue data and a hierarchical index, the content data having a plurality of media frames, the cue data being associated with each frame of the plurality of frames and the hierarchical index being associated with a subset of the cue data; decoding the content data by a playback device; displaying content on a display screen from the decoded content data; receiving a user request; locating the index based on the user request; and decoding one or more media frames from the subset of the cue data based on the located index.

In another embodiment, a method of encoding a media file for playing back by a playback device comprises incorporating seek locations with content data, the content data having audio, video and subtitle tracks, the seek locations identifying particular timestamps for particular frames within the audio, video or subtitle tracks; incorporating an index referencing the incorporated seek locations; and creating a media file having the content data, the incorporated seek locations, and the incorporated index.

In yet another embodiment, a system for playback of a media file comprises a media server configured to transmit a media file having at least one index having pointers that reference at least one frame of media content within the media file. A client processor in network communication with the media server and configured to send requests for the media file to the media server is also provided. The media server is configured to transmit the media file requested and the client processor comprises a playback engine that is configured to locate a pointer from the at least one index to locate and decode the portions of the media file based on the located pointer to comply with user playback instructions.

In one embodiment, a method of decoding a multimedia file having an index included with the multimedia file is provided. The method comprises locating an index within a multimedia file, the index having a plurality of index data-points and the multimedia file having a plurality of frames and a plurality of cue data-points having a time stamp and a location of a specific frame of the plurality of frames; loading the located index into storage; locating an index data-point from the plurality of index data-points based on a timestamp; and locating a cue data-point from the plurality of cue-data points based on the located index data-point.

The above-mentioned and other features of this invention and the manner of obtaining and using them will become more apparent, and will be best understood, by reference to the following description, taken in conjunction with the accompanying drawings. The drawings depict only typical embodiments of the invention and do not therefore limit its scope.

DETAILED DESCRIPTION

Turning now to the drawings, multimedia files including indexes in accordance with embodiments of the invention are described. In a number of embodiments, the index is a hierarchical index. A hierarchical index is a representation of index information in a form that provides a coarse index to a few predetermined locations within the multimedia file followed by a further refined representation of the portions of the multimedia file. In many embodiments, the lowest level of the index is sufficiently granular as to identify every frame in the multimedia file. When a hierarchical index is used, a player need only request a small amount of relevant index information in order to commence playing a multimedia file. As such, the hierarchical index lowers the memory footprint needed by playback devices to effectively seek and perform trick-play operations on a multimedia file. Additionally, file load times for playback are reduced and trick-track load performance enhanced. In one embodiment, the hierarchical index has index information that includes offsets into cue points within a multimedia file with timestamps allows lookups to be fast and efficient.

In several embodiments, the multimedia file includes a reduced index. Players in accordance with embodiments of the invention can utilize a reduced index to rapidly move between accesses or key-frames when performing trick play functions. The reduced index can be in conjunction with a hierarchical index. However, reduced indexes can be included in multimedia files that do not include a hierarchical index. A reduced index only provides the location of the accesses or key-frames within a multimedia file, along with a time-stamp value to indicate their corresponding time within the multimedia presentation. In a number of embodiments, bit field flags and associated data fields are used to represent index information. Such a representation can be used in accordance with embodiments of the invention to express index information, a hierarchical index and/or a reduced index.

Hierarchical Indexes

Figure 1:
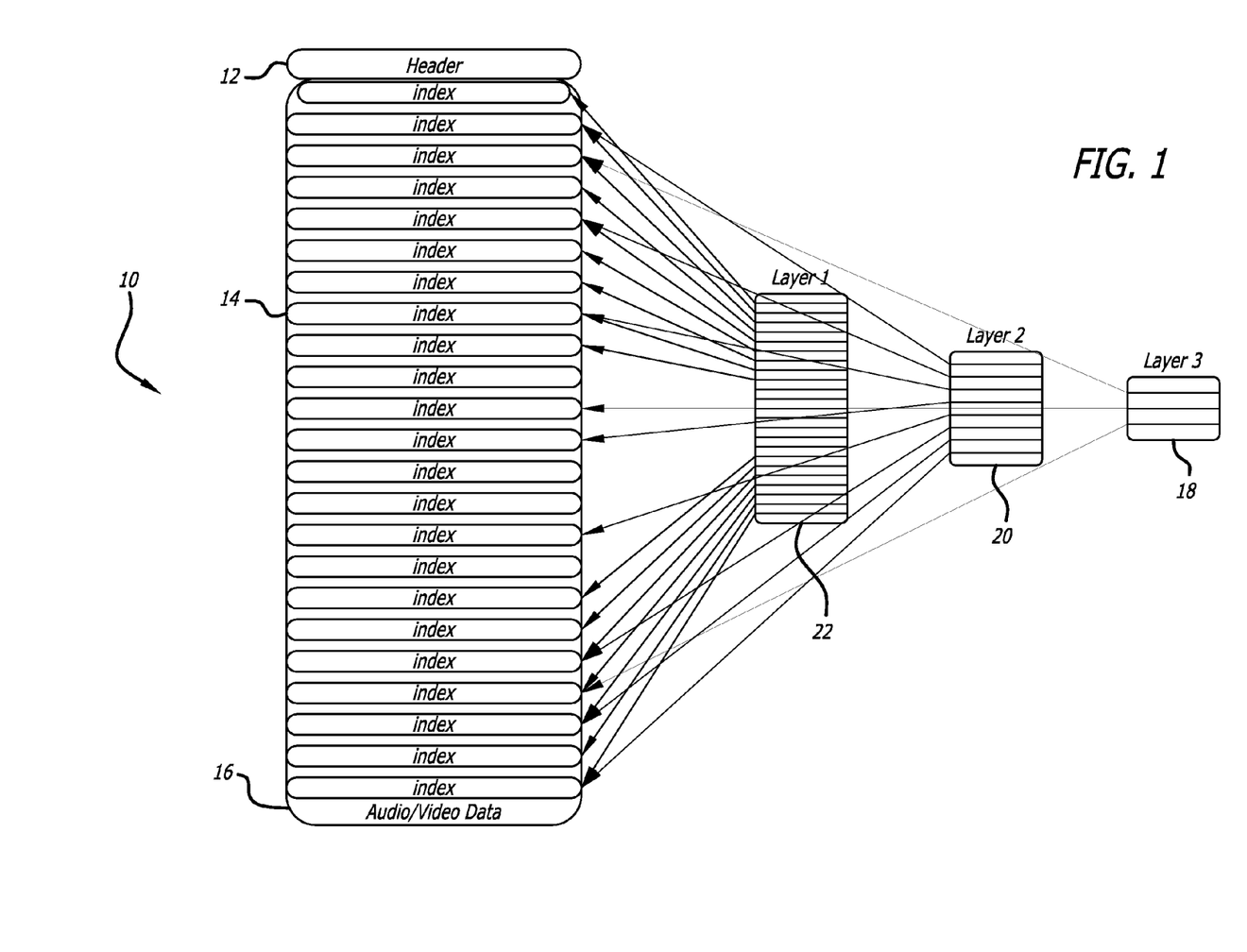
FIG. 1 is a graphical representation of an index structure within a multimedia file in accordance with an embodiment of the invention.

A multimedia file containing a hierarchical index in accordance with an embodiment of the invention is shown in FIG. 1. The multimedia file 10 includes header information 12, index information 14 interleaved amongst audio/video data 16 and a three layer hierarchical index. The coarsest layer 18 of the hierarchical index includes a small number of references to pieces of index information. The middle layer 20 and the finest layer 22 each include successively larger numbers of references to index information.

In many embodiments, the index information 14 interleaved amongst the audio/video data 16 lists the location of encapsulated audio, video, subtitle, and/or other similar data. Typically, each block of interleaved index information lists the encapsulated media immediately following the block of interleaved index information. In several embodiments, the index information 14 contains information that describes the absolute or relative location of the start of each piece of encapsulated media. In a number of embodiments, the interleaved index information 14 includes the size of each indexed piece of encapsulated media, in addition to information indicating whether the indexed piece of encapsulated media can be used as an access or key-frame, its presentation time value, and other information, which may be helpful to a decoding device.

Each layer in the hierarchical index includes references to the interleaved index information 14 within the multimedia file 10. The implementation of the hierarchy structure can be inclusive or exclusive, meaning that the data in each layer can be repeated in the other layers or each layer may contain unique position information. In addition, the number of elements at each layer of a hierarchy and the total number of layers can be pre-determined, limited based on pre-determined values, or unbounded.

Figure 2A:
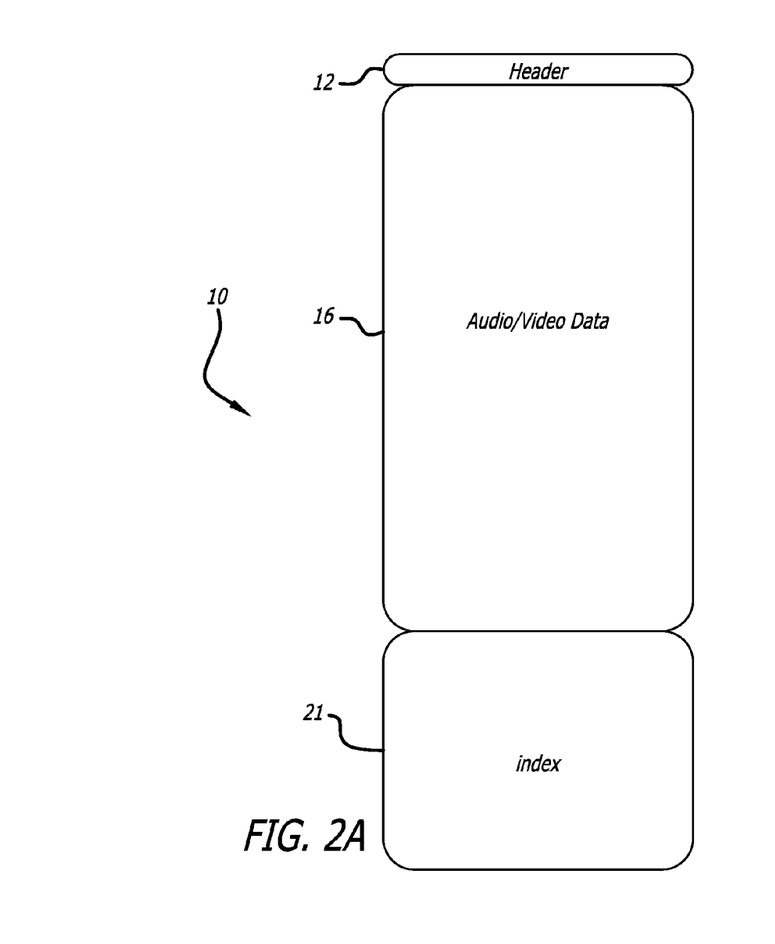
FIG. 2A is a graphical representation of an index structure following the audio/video data of a multimedia file in accordance with an embodiment of the invention.
Figure 2B:
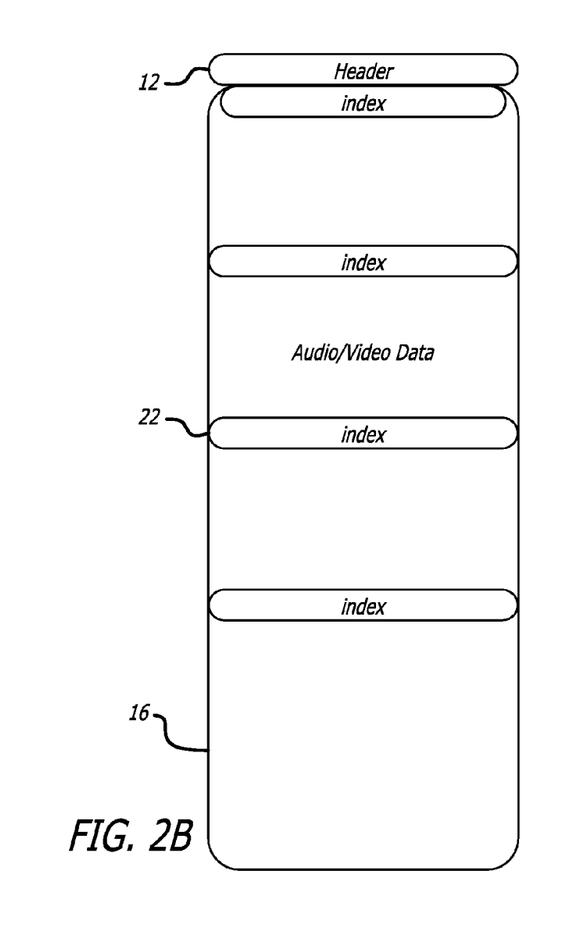
FIG. 2B is a graphical representation of an index structure interleaved within the audio/video data of a multimedia file in accordance with another embodiment of the invention.

Although a specific implementation of a hierarchical index is shown in FIG. 1, hierarchical indexes can be implemented in many different ways. For example, the index values can be stored in a single part of the file, or distributed in clusters in the file. Multimedia files containing different distributions of index information in accordance with embodiments of the invention are shown in FIGS. 2A-B. For example, the index information could be appended or pre-pended to the audio/video data portion 16 of the multimedia file 10 as an entire unit 21. Index clusters 22 shown in FIG. 2B can also be woven into the audio/video data portion. In addition to distributing index information in different ways, the hierarchy itself can be implemented as a structure that points to the actual frames in a file (as opposed to blocks of index information), which may or may not start with access or key-frame positions.

Figure 2C:
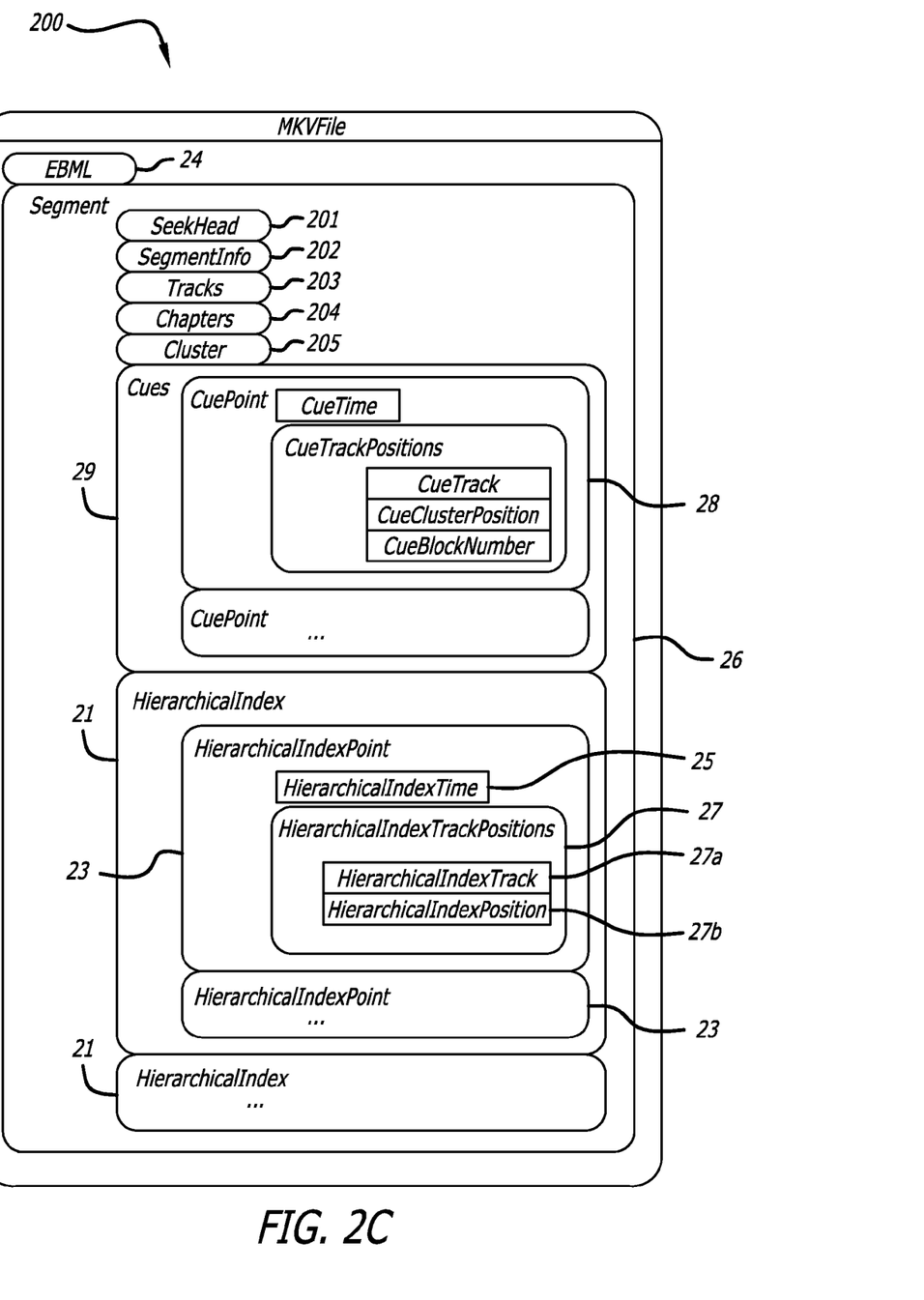
FIG. 2C is a detailed graphical representation of an index structure relative to other portions of a multimedia file in accordance with an embodiment of the invention.
Figure 2D:
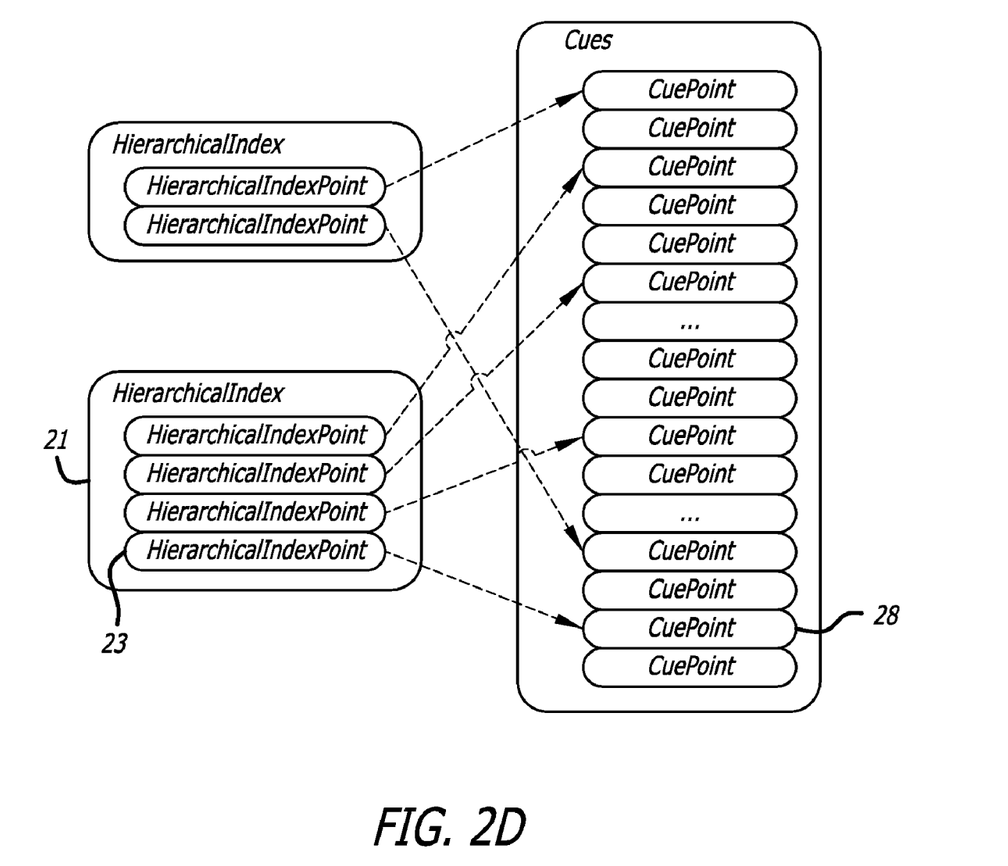
FIG. 2D is a graphical representation of an index structure relative to cue data of a multimedia file in accordance with an embodiment of the invention.

FIG. 2C further details the hierarchical index 21 within a larger hypothetical file structure MKV file 200. This file structure is made of two primary sections, the EBML 24 and the Segment 26. In this file structure, the Segment may host the Seek Head 201, Segment Info 202, Tracks 203, Chapters 204, Cluster 205, Cues 29, and a Hierarchical Index 21. As shown, a plurality of hierarchical indexes 21 could be included with the multimedia file. Additionally, each hierarchical index can include multiple hierarchical index points 23. These index points in various embodiments have a timestamp 25 and a track position 27, specifying a specific media track 27a and a position or offset 27b from the timestamp 25. Cues 29 are also shown and as will be explained in more detail below are utilized by the index points 23 to increase access to specific points within a multimedia file. This dynamic structure for example is shown in FIG. 2D where multiple hierarchical index points 23 reference or point to multiple cue points 28. In various embodiments, the hierarchical index contains references to a fraction, e.g., one tenth, of cue points relative to the total number of cue points in a media file. One would appreciate that the references can increase to increase the granularity of pointers or references to the cue points.

A player attempting to decode a multimedia file that includes a hierarchical index in accordance with an embodiment of the invention typically uses the hierarchical index as necessitated by the functions the player is requested to perform. When trick play functions are requested, the player can locate an index in the hierarchy corresponding to a specific speed and decode each of the frames indicated by the index. The manner in which a specific frame is located using the index depends upon the nature of the index. In embodiments where each index in the hierarchy points directly to video frames, then the process is simple. In embodiments where the index points to additional index information within the multimedia file, the additional index information is accessed and used to locate a desired frame.

Reduced Indexes

Many multimedia files in accordance with embodiments of the invention use reduced index information. Reduced indexes can be used in conjunction with a hierarchical index or in multimedia files that do not include a hierarchical index. A reduced index does not include information concerning every piece of multimedia information within a multimedia file. A reduced index typically is restricted to information concerning the location of access or key-frames and the time stamp of the access or key-frames. Access frames are generally video frames that can be independently decoded, although the reduced index can be used to point to any other type of key-frame for other streams stored in the multimedia file. The reduced index can enable a player to rapidly skip between key frames when performing trick play functions.

In a number of embodiments, a reduced index is only provided for a single or primary data type and offsets are provided for each of the other streams of data contained within the file which may be related to the primary data type. The offsets can be used by a player to facilitate synchronized playback of different media. In several embodiments, each piece of index information also includes the size of the access or key-frame and the data-type of the access or key-frame. A player decoding a multimedia file that contains a reduced index in accordance with an embodiment of the invention can use the reduced index to perform trick play functions in a similar fashion to the way in which a player uses a hierarchical index. The player can sequence through the reduced index inspecting the Timestamps of access or key frames to ascertain which frames to render in order to achieve a desired speed.

Expressing Index Information Using Bit Fields

Figure 3:
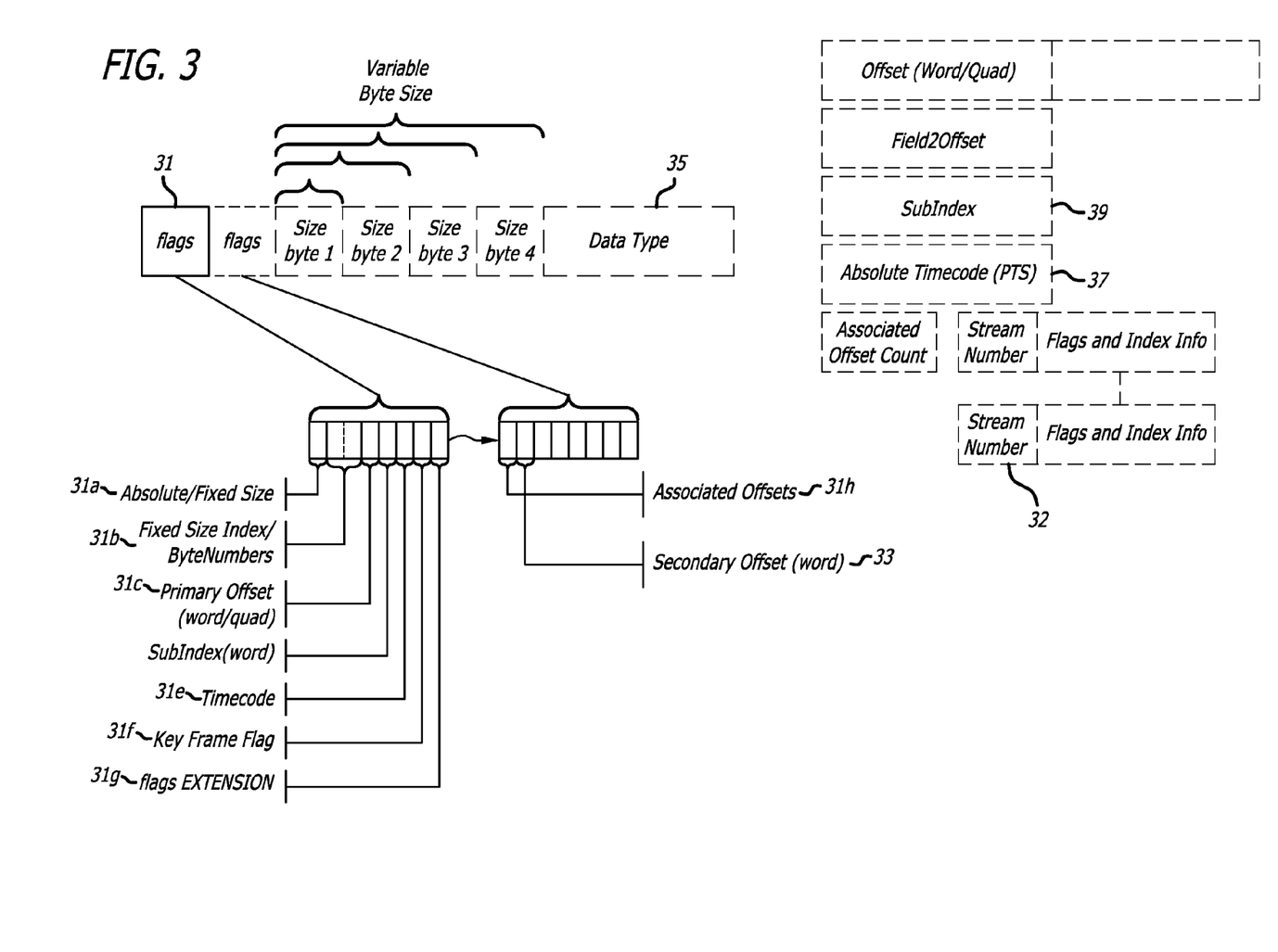
FIG. 3 is a graphical representation of index structure detailing bit flags and associated data filed within a multimedia file in accordance with an embodiment of the invention.

Multimedia files in accordance with a number of embodiments of the invention utilize bit field flags and associated data fields to express index information. In many embodiments, the bit field flags are used to signal the presence of a set of corresponding variable length data fields that contain index information. Bit field flags 31 and data fields 32 that can be used to express index information concerning a piece of multimedia information in accordance with an embodiment of the invention are shown in FIG. 3. In the illustrated embodiment, a set of bit-field flags signals the presence of additional data following the flags. The bit-field flags are specified as 8-bits in their entirety, but that is not necessarily a requirement for other implementations. The first bit of the flag may indicate an Absolute/Fixed Size field 31a, which determines whether the size of the frame is read from a pre-determined set of sizes stored in a separate section of the file, or whether they are available as a series of bytes following the flags field. Two additional bits, Fixed Size Index/Byte Numbers field 31b, are used to determine the index-position of the size value or the total number of bytes used to represent the value, depending on the setting of the Absolute/Fixed Size bit or field 31a. The next bit, a Primary Offset field 31c, determines the size of the offset value, which may be the location of the frame. This bit is selected amongst two pre-determined byte numbers, for example either a 4-byte value or 8-byte value. Likewise, a flag may indicate the presence of another predetermined offset, e.g., a Secondary Offset 33, which can be 4 bytes and represents a relative offset from the Primary Offset value. A bit 31e indicating the presence of a timecode byte sequence may also be present, along with another bit, Key Frame Flag bit 31f, which can be used to determine the presence of access or key frames. In many embodiments, bit field flags and data fields similar to those shown in FIG. 3 are used to index the location of all frames in a multimedia file.

The number of flags that can be represented via the structure shown in FIG. 3 is infinitely extensible using a "Flags Extension" bit 31g which signals the presence of a follow-on flag. Here, one bit 31h may be referred to as "Associated Offsets". Associated offsets may then signal the presence of a byte value, which is used to determine the number of streams which correspond to the current frame. These relative offsets may use the same flag and subsequent index information for other frames in the stream, to be used for synchronization purposes. The frames identified by the relative offsets, when played back correctly, may provide a synchronized presentation of audio, video, subtitles, and other related data. The stream number value 32 often corresponds to the actual stream numbers stored in the file.

Figure 4:
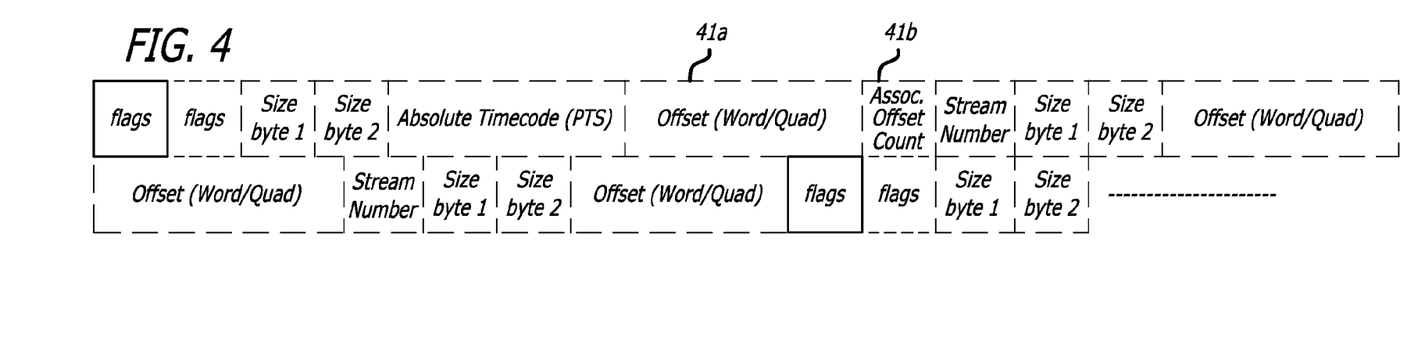
FIG. 4 is a graphical representation of index structure providing time codes and offset data fields within a multimedia file in accordance with an embodiment of the invention.

Index information represented using the two relative offset values 41a,b is shown in FIG. 4. In many embodiments, the data type for each frame is indicated for an entire group of frames, or alternatively is indicated on a frame-by-frame basis, in which case a "Data Type" field 35 is added to the index-structure. The presence of a Timecode value 37 to indicate the exact time of a frame in an overall presentation may be done via a set of pre-determined specifications. For example, the Timecode value could be required for all video access frames; alternatively, the presence of a Timecode could be mandatory on a periodic basis for audio samples. It is only important to note that the Timecode value is optionally present and is indicated by a corresponding bit-flag.

Figure 5:
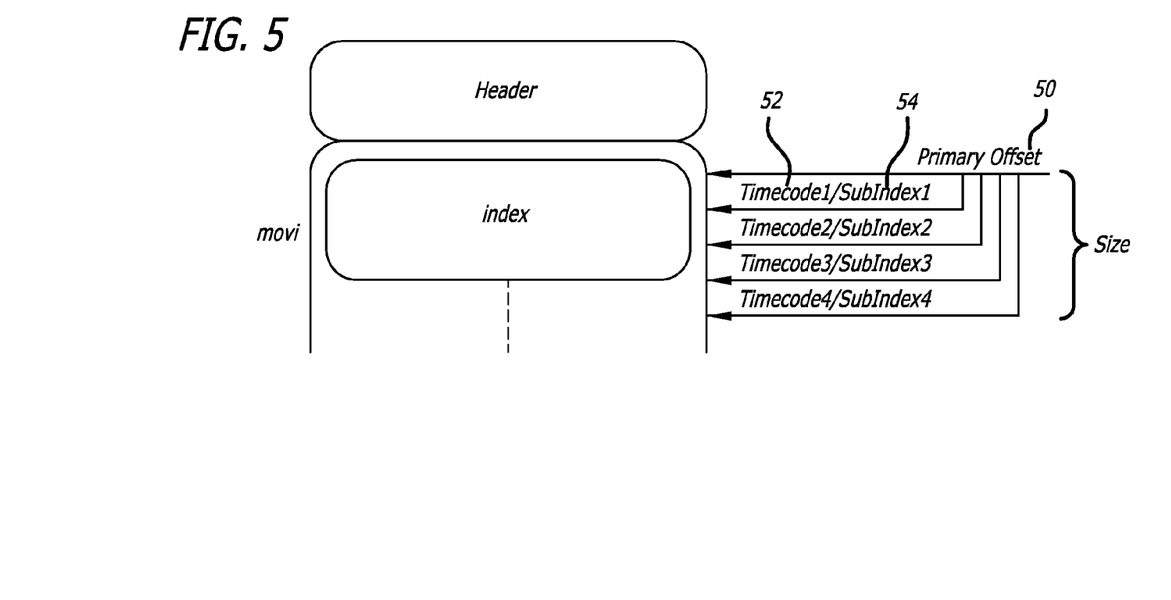
FIG. 5 is a graphical representation of index structure with time codes and multiple offset data fields relative to a size data field within a multimedia file in accordance with an embodiment of the invention.

Through a set of pre-determined rules, structures similar to those described above can be applied for the representation of hierarchical indexing in accordance with embodiments of the invention. For example, the "Primary Offset" value 50 can point to a specific index position, along with the Timecode value 52 indicating the exact time-stamp of the index. An additional bit-field 39, the "Subindex", can point to a relative offset from the position indicated by the "Primary Offset". This "Subindex" position 54 is a refinement from the beginning of a larger index cluster. Use of various values to construct a hierarchical index in accordance with an embodiment of the invention is shown in FIG. 5.

Figure 6:
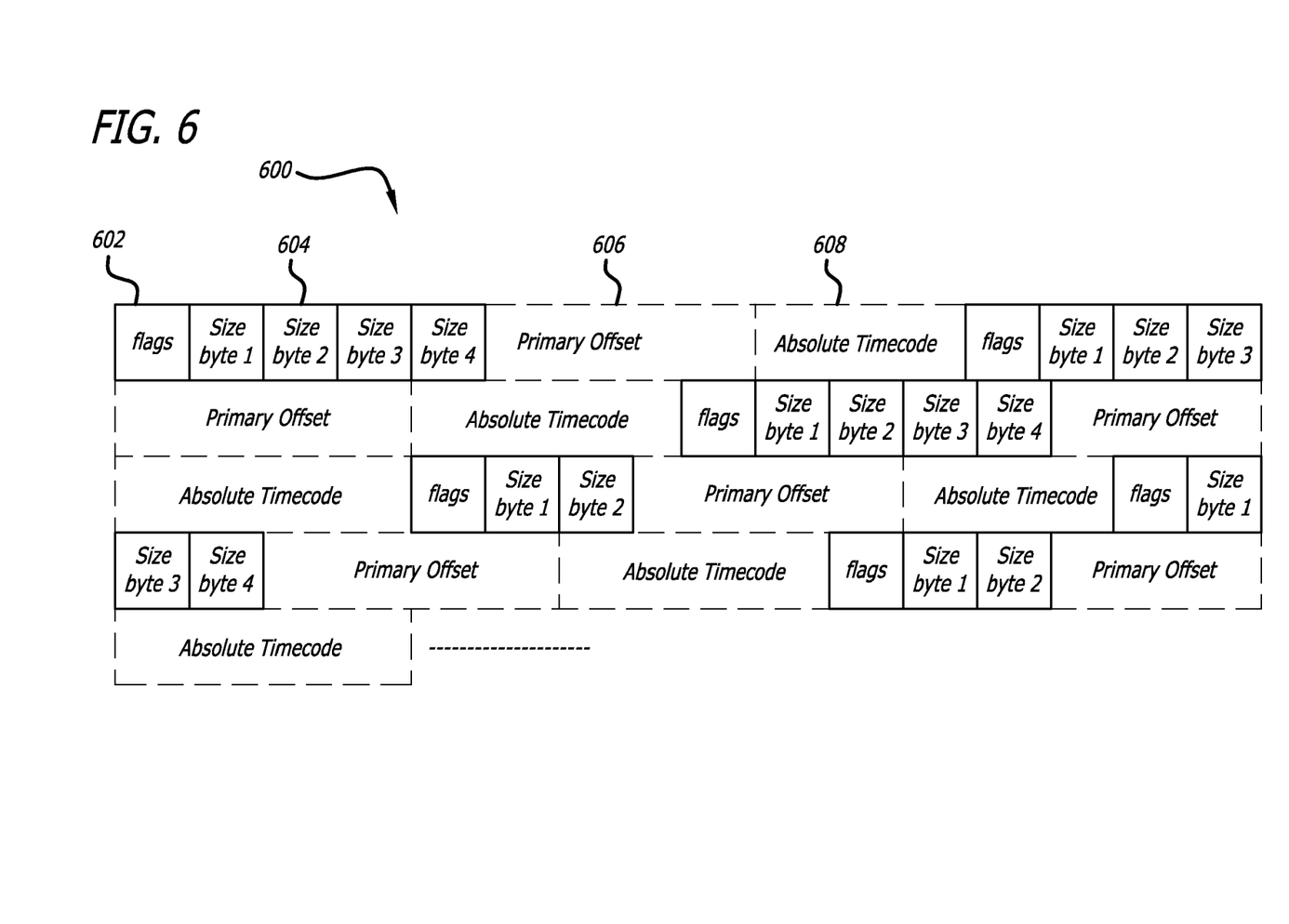
FIG. 6 is a graphical representation of index structure with time codes and primary offset data fields within a multimedia file in accordance with an embodiment of the invention.

Bit field flags and associated data fields can also be used to represent a reduced index structure pointing to a series of access or key frames for a particular stream in a file. A reduced index in accordance with an embodiment of the invention is shown in FIG. 6. In the illustrated embodiment, the "flags" field 602 is followed by a corresponding set of size bytes 604, a "Primary Offset" value 606, and a Timecode 608. The access frames may typically be related to video frames in a file, though again this field could be defined for all stream types in a file. The structure 600 shown in FIG. 6 stores the location of all access or key-frames, and can contain the location of all related offsets for the encapsulated tracks in the file.

It is important to note that the use of flexible bit field flags enables the implementation of multiple data structures which may appear in the hierarchical, reduced, and conventional indexing schemes. The use of bit fields as flags indicating variable length data can help optimize the size of an overall index because not all members are in general required by all frames.

Figure 7:
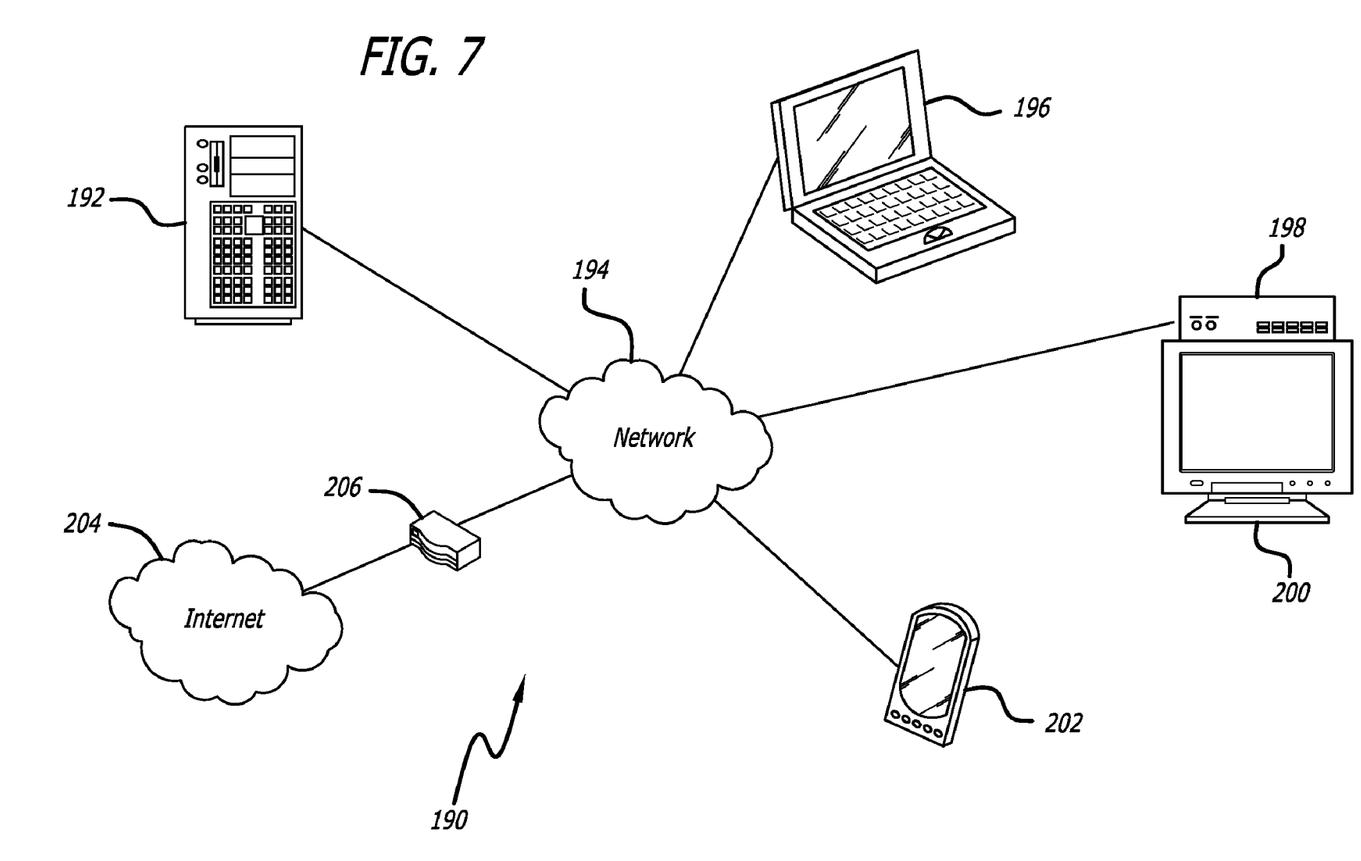
FIG. 7 is a semi-schematic network diagram of playback system for streaming and fixed media file playback in accordance with an embodiment of the invention.

Referring now to FIG. 7, a progressive playback system in accordance with an embodiment of the invention is shown. The playback system 190 includes a media server 192 connected to a network 194. Media files are stored on the media server 194 and can be accessed by devices configured with a client application. In the illustrated embodiment, devices that access media files on the media server include a personal computer 196, a consumer electronics device such as a set top box 18 connected to a playback device such as a television 200, and a portable device such as a personal digital assistant 202 or a mobile phone handset. The devices and the media server 192 can communicate over a network 194 that is connected to the Internet 204 via a gateway 206. In other embodiments, the media server 192 and the devices communicate over the Internet.

The devices are configured with client applications that can request portions of media files from the media server 192 for playing. The client application can be implemented in software, in firmware, in hardware or in a combination of the above. In many embodiments, the device plays media from downloaded media files. In several embodiments, the device provides one or more outputs that enable another device to play the media. When the media file includes an index, a device configured with a client application in accordance with an embodiment of the invention can use the index to determine the location of various portions of the media. Therefore, the index can be used to provide a user with "trick play" functions. When a user provides a "trick play" instruction, the device uses the index to determine the portion or portions of the media file that are required in order to execute the "trick play" function and requests those portions from the server. In a number of embodiments, the client application requests portions of the media file using a transport protocol that allows for downloading of specific byte ranges within the media file. One such protocol is the HTTP 1.1 protocol published by The Internet Society or BitTorrent available from www.bittorrent.org. In other embodiments, other protocols and/or mechanisms can be used to obtain specific portions of the media file from the media server.

Referring to FIGS. 8-11, one embodiment of a process of utilizing the index structure is shown. A media file, e.g., MFile 120, is received from, for example, a media server based on a media file request from a playback device or in particular a playback engine of the playback device [111]. Upon locating the requested media file, the media server transmits all or some portions at a time of the media file to the playback device. The playback device in one embodiment decodes the transmitted media file to locate the hierarchical index [112]. In one such embodiment, referring to FIG. 9, the playback device traverses or parses the file starting from EBML (Extensible Binary Meta Language) element 128, the Segment element 129 and then the contents of the Seek Head 121 to locate the Hierarchical Index 127. As such, the Segment information 122, Tracks 123, Chapters 124, Clusters 125 and Cues 126, although could be also parsed, can be bypassed to quickly locate the Hierarchical Index. The located Index is then loaded into memory [113]. Loading the Index into memory facilitates access to locate a desired packet or frame to be displayed or accessed by the playback device.

Figure 8:
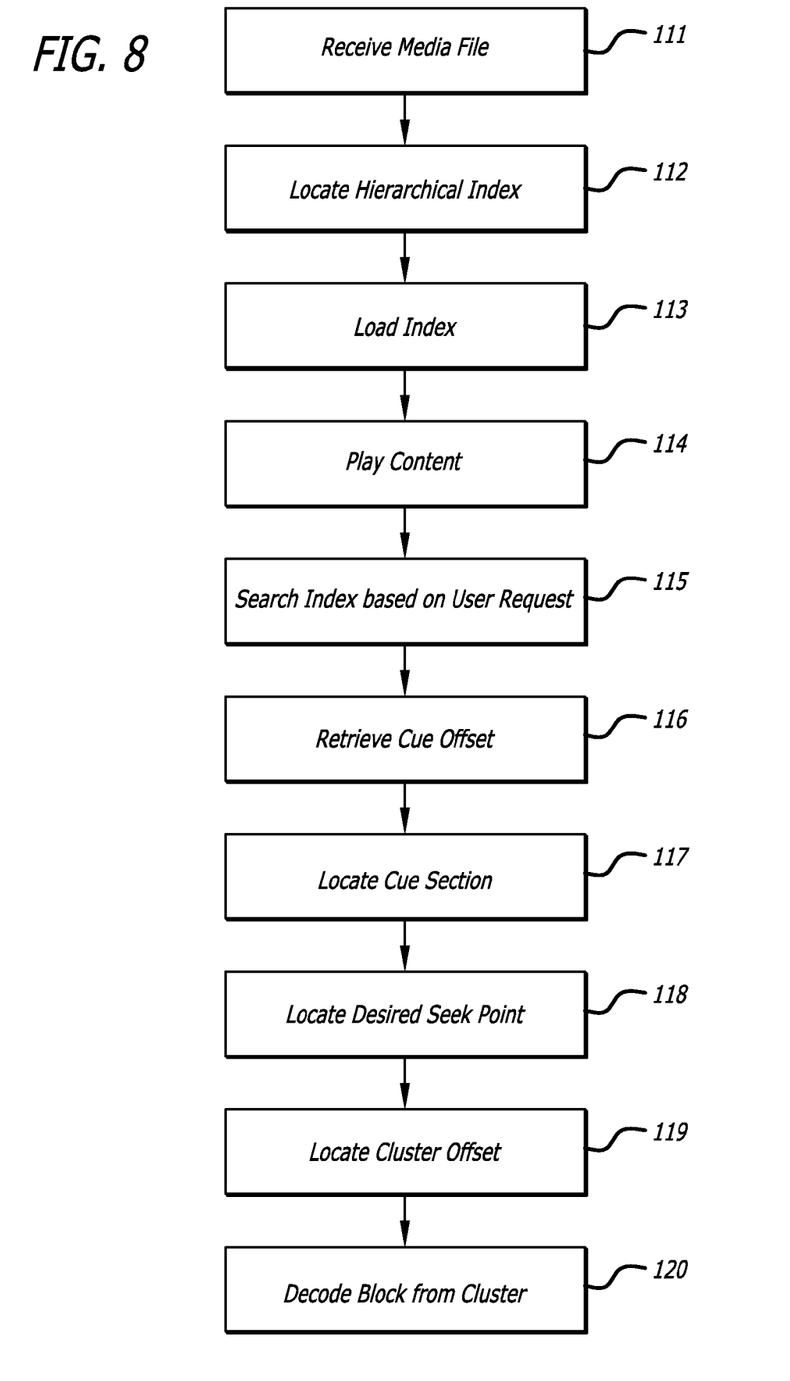
FIG. 8 is a flowchart of a process utilizing index structure within a multimedia file in accordance with an embodiment of the invention.
Figure 9:
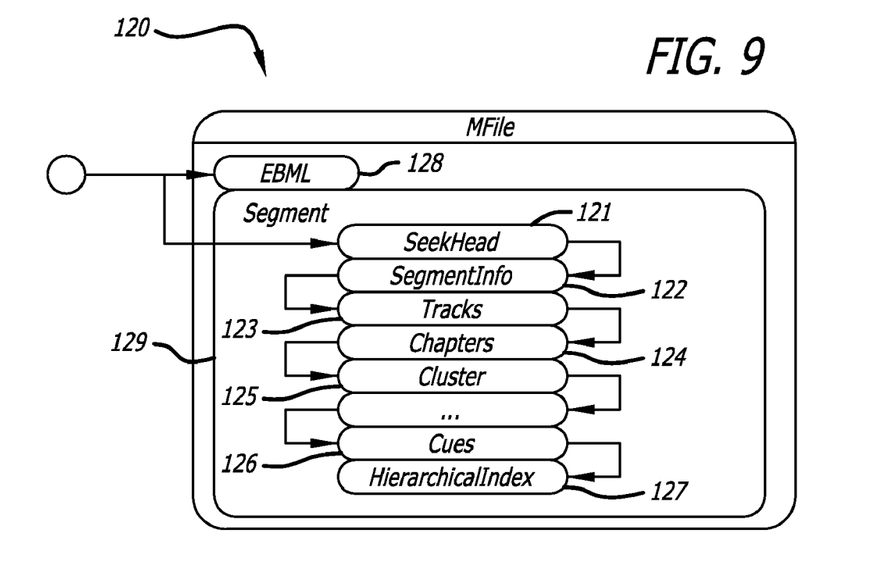
FIG. 9-11 are graphical representations with increasing detail of an index structure within a multimedia file in accordance with one embodiment of the invention and to further illustrate the process of FIG. 8.

The Hierarchical Index is small enough for many low memory playback devices, e.g., low level consumer electronic devices, to hold the entire Index in memory and thus avoiding a complex caching scheme. In cases, where the Index is too large to store in memory or generally more feasible, no loss in seek accuracy occurs. With the Index being a lookup table or mechanism into the cues or defined seek points for each of the tracks and not the actual seek points, the dropping of portions of the Index can cause a few additional reads when searching the cues for a desired seek point. The playback device accesses the bit stream packets or frames of the transmitted media file to play the audio, video, and/or subtitles of the media file [114].

Upon a user request, e.g., a trick-play request, the playback device searches the loaded or cached Hierarchical Index to find an entry or hierarchical point equal to or nearest and preceding to the desired time or seek point [115]. In one embodiment, the particular hierarchical point is located based on the presentation time or timestamp of the content being played and the user request, e.g., the speed and/or direction of trick-play function. In the illustrated case, FIGS. 10-11, the desired timestamp is 610 seconds within the bit stream.

Figure 10:
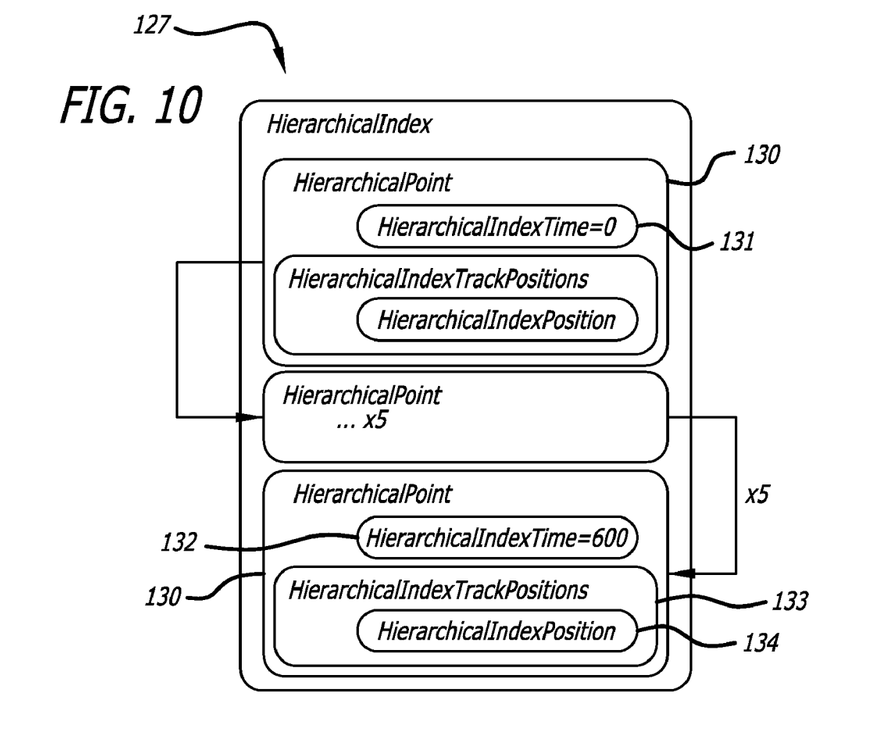

FIG. 10 demonstrates a total of 6 hierarchical access points 130, starting from Index Time zero [Hierarchical Index Time 131] to Index Time 600 [Hierarchical Index Time 132], where five of the Hierarchical Points on this diagram have not been shown. After locating the closest hierarchical point to the desired seek time [in this case Index Time 600], an Index Position or offset 134 is retrieved from Track Position 133 to locate a portion of cues that contains the desired seek point [116]. The playback device seeks to the located portions of cues [117] and the cues are read through until an entry equal to, or nearest and preceding to the desired time or seek point is located [118].

Utilizing the located cue, the playback device retrieves an offset value to seek and find the desired cluster [119]. A block in the desired cluster that has a corresponding timestamp as the desired timestamp, e.g., 610, is located and decoded [120] for display by the playback device. The process continues until a user request stops playback of the media file.

Figure 11:
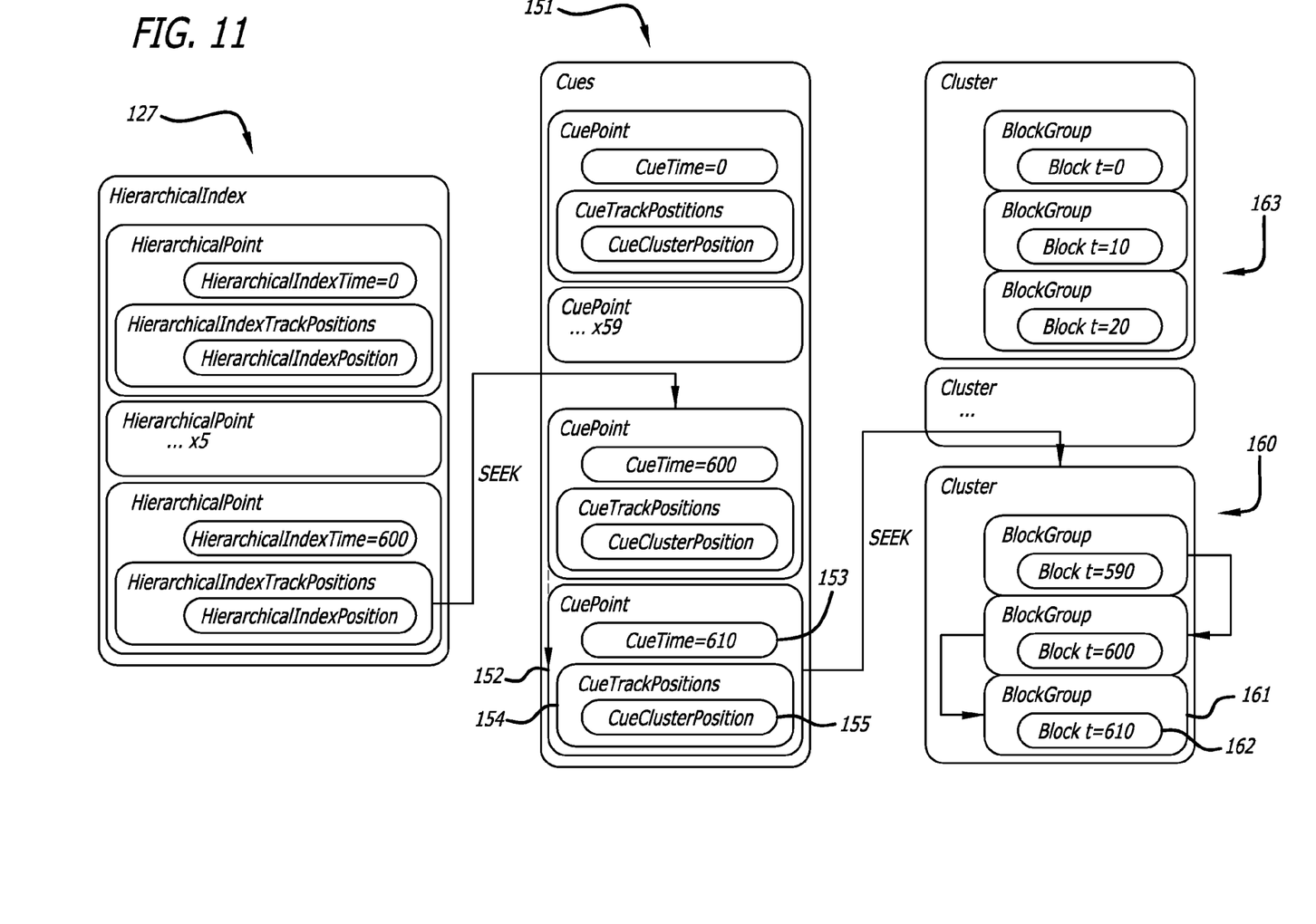

This concept is further clarified in FIG. 11. The Hierarchical Index time of 600 is identified from the Hierarchical Index structure 127 as previously described in reference to FIG. 10. In this particular example, the Index position within the Cues structure 151 is used to access the particular Cue Point 152 which corresponds to time 610 [Cue Time 153]. The Cue Point 152 through data in Track Position 154 and Cluster Position 155 generally points to the Cluster structure 160 which may host several seconds' worth of multimedia data.

The multimedia data within a Cluster 160 may be stored as a Block Group 163, where individual Blocks of data corresponding to one or more access units of the elementary audio, video, subtitle, or other multimedia information exist. As such, Clusters contain block groups but can also contain only simple blocks. In the absence of a Block Group, it may be possible that a Cluster can host individual Blocks or a Simple Block. The corresponding Cluster Position 155 from the Cue Point 152 is used to locate the Cluster 160 and the desired Block 161 can be identified based on its time stamp (Block Time 162). In case where an exact time stamp is not matched, the Block with the closest time stamp can be identified.

The procedure for locating a Block according to a particular time may be repeated for multiple tracks of multimedia data such that all of the data in the corresponding Blocks are presented in a synchronized manner.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of playing back content by a playback device stored in a media file, the method comprising:
   providing a media file to a playback device, the media file having content data, cue data and a hierarchical index, wherein the content data comprises a plurality of encapsulated video frames, the cue data comprises index information that references the location of individual frames of encapsulated video within the media file and the hierarchical index comprises references to index information within a subset of the cue data;
   decoding the content data by a playback device;
   displaying content on a display screen from the decoded content data;
   receiving a user request;
   identifying a portion of the hierarchical index based on the user request;
   identifying index information within a subset of the cue data based upon the identified portion of the hierarchical index; and
   decoding one or more video frames referenced by the identified index information within the subset of the cue data.

2. The method of claim 1 wherein the hierarchical index has reference values that point directly to particular video frames of the plurality of encapsulated video frames.

3. The method of claim 1 wherein the hierarchical index includes pointers to the cue data within the media file and further comprising accessing the cue data through the pointers to locate a video frame to be decoded.

4. The method of claim 1 wherein the hierarchical index is associated with a subset of the plurality of encapsulated video frames through a second hierarchical index and further comprising locating a subset of the second hierarchical index based on the hierarchical index relative to the user request.

5. The method of claim 4 wherein decoding one or more video frames from the subset of the plurality of encapsulated video frames is based on the located subset of the second hierarchical index.

6. The method of claim 1 wherein the media file has an upper hierarchical index associated with the hierarchical index and the hierarchical index associated with one or more video frames from the subset of the plurality of encapsulated video frames and wherein the upper hierarchical index has a greater number of associations with one or more video frames than the hierarchical index.

* * * * *